United States Patent [19]

Halasa et al.

[11] 4,291,139

[45] Sep. 22, 1981

[54] PROCESS FOR PREPARATION OF BLOCK COPOLYMERS

[75] Inventors: Adel F. Halasa, Bath; James E. Hall; Adolph Para, both of Akron, all of Ohio

[73] Assignee: The Firestone Tire & Rubber Company, Akron, Ohio

[21] Appl. No.: 776,048

[22] Filed: Mar. 9, 1977

[51] Int. Cl.³ ............................................ C08F 297/04
[52] U.S. Cl. ................................ 525/314; 260/33.6 A
[58] Field of Search ...................... 260/880 B; 525/314

[56] References Cited

U.S. PATENT DOCUMENTS

| | | | |
|---|---|---|---|
| 3,231,635 | 1/1966 | Holden | 260/880 B |
| 3,427,364 | 2/1969 | Shaw | 260/880 B |
| 3,937,760 | 2/1976 | Cole | 260/880 B |
| 4,089,913 | 5/1978 | Miki | 260/880 B |

FOREIGN PATENT DOCUMENTS 1130770  10/1968  Japan .

OTHER PUBLICATIONS

Smith Defensive Publication T953011, published Dec. 7, 1976 (pp. 1-13 of Smith SN431531, parent case of T953011 enclosed).

*Primary Examiner*—Paul R. Michl

[57] ABSTRACT

The process described herein involves the preparation of block copolymers of the S-B-S type wherein S represents a block of polystyrene and B represents a block of polybutadiene. In order to have the initial polystyrene block soluble in the polymerization medium, cyclohexane and aromatic hydrocarbons have been used as the diluent or solvent in these polymerizations. The present process permits the use of hexane as diluent by first preparing a "foot" or small block of homopolydiene to which the initial polystyrene block is thereafter attached. This small block of homopolydiene represents no more than 12 parts, preferably no more than 10 parts by weight of homopolydiene per 100 parts by weight of the block of polystyrene to which it is attached. Generally therefore this block has a molecular weight of 200-5000 depending on the size of the attached polystyrene block and is not large enough to alter the properties of the resultant S-B-S block copolymer except to give the initial polystyrene block greater dispersibility in hexane, heptane, etc.

11 Claims, No Drawings

PROCESS FOR PREPARATION OF BLOCK COPOLYMERS

BACKGROUND OF THE INVENTION

1. Field of the Invention

This invention relates to a process for the preparation of block copolymers of the S-B-S type wherein S represents a polystyrene block and B represents a polybutadiene block. More specifically, this invention relates to a process in which hexane is used as the polymerization medium. Still more specifically, this process relates to the preparation of an initial small block of polydiene to give solubility or dispersibility to the initial block of polystyrene.

2. Related Prior Art

Block copolymers of the S-B-S type are known and are considered to be of great utility as self-curing elastomers or as modifiers for diene elastomers. These have a central core of polybutadiene and two terminal blocks of polystyrene. However, in view of the greater insolubility or non-dispersibility of the initial polystyrene block, a solvent such as an aromatic hydrocarbon or cyclohexane has been used in its preparation.

This problem is recognized in British Patent No. 1,130,770 which states on page 2, lines 60-65, "In each of these processes, however, a vinyl aromatic hydrocarbon is required to be first polymerized and therefore the polymerization solvent used must be wholly or mainly a naphthenic or aromatic hydrocarbon solvent."

Similar recognition of this solubility problem is indicated in U.S. Pat. Nos. 3,231,635, 3,265,765 and 3,427,364 wherein statements are made regarding the necessity to use aromatic or naphthenic solvents or mixtures of these with other solvents.

Brtish Pat. No. 1,130,770 effects polymerization in each step of a mixture of butadiene and styrene. Therefore in forming the initial block, the butadiene is described as giving hexane solubility to the resulting block polymer. As discussed in the following section taken from lines 32-56 of page 4, patentee discourages against the use of less than 10% butadiene for the initial block: "The monovinyl aromatic hydrocarbon content of the mixture of conjugated diolefin and monovinyl aromatic hydrocarbon, which is first polymerized by use of a monolithium hydrocarbon, is preferably from 15% to 90% by weight. If the content were less than 15% by weight, the elastic properties of the finally obtained copolymer would suffer. On the other hand, if the content were more than 90% by weight, the finally obtained copolymer would have lower thermal resistance; moreover, in this case the polymerization medium used would have to be wholly or mainly a naphthenic or aromatic hydrocarbon solvent. Further, owing to the lower solubility of the initially formed copolymer in paraffinic aliphatic hydrocarbon solvents it would be impossible to obtain a homogeneous solution or a slurry of sufficient dispersibility in such a solvent, so the subsequent additional copolymerization reaction after addition of a mixture of conjugated diolefin and monovinyl aromatic hydrocarbon would hardly proceed uniformly, whereby the physical properties of the finally obtained copolymer would suffer."

In every working example except one, the patentee uses at least 40% by weight and in some cases 50% and 65% of the conjugated diene in the initial monomer mixture. In only one example (Ex. 7) does the patentee use less than 40% and in that example he uses 20% isoprene and 80% styrene in the initial monomer mixture. Therefore patentee has not demonstrated that monomer mixtures having 10-15% by weight of conjugated diene will form an initial polydiene block to give hexane solubility.

When a high concentration of diene is present in a monomer mixture it is known that the initial block of polymer is a polydiene block as will be the case when 40-65% of diene is initially present. However, when the concentration of the diene is lower, that is 15% or less of diene and 85% or more of styrene, the tendency for random copolymerization of diene and styrene increases and the tendency is even stronger as the concentration of diene falls below 10% by weight. Therefore, while concentrations of 40-65% diene will give an initial block of polydiene that will give hexane solubility, the use of 15% or less of diene is much more likely to give an initial, more difficultly soluble random copolymer block.

British Pat. No. 1,412,584 has modified the process of preparing block copolymers so that heptane may be used as the polymerization medium, by making first a block of t-butyl-styrene and describes this first block as a thermoplastic polymer of 10,000 to 100,000 molecular weight to give solubility to the growing block copolymer. The second or middle block of polybutadiene is then added and finally a block of polystyrene. The resulting block copolymer is poly(t-Bu-styrene)-polyubutadiene-polystyrene.

Because of its lower boiling point and the resultant energy savings in the use of hexane as compared to benzene and cyclohexane, it is desirable to have a process designed to permit the use of hexane in preparing the S-B-S block copolymers. Moreover, the use of a process conducted in hexane makes it adaptable for use in equipment designed for the preparation of polybutadiene in hexane. Obviously the substitution of a poly(t-Bu-styrene) block for a polystyrene block is not a desirable solution for this problem, principally because of the additional cost of t-butyl-styrene as compared to styrene and because of the differences in properties between the two types of blocks.

STATEMENT OF THE INVENTION

In accordance with the present invention it has been found possible to improve the dispersibility of the initial polystyrene block in forming an S-B-S type of copolymer by first preparing a small block of homopolydiene, such as homopolybutadiene, representing 2-12 parts, preferably 5-10 parts by weight per 100 parts by weight of the adjacent polystyrene block, and generally having a molecular weight of 200-5,000, depending on the molecular weight of the adjacent polystyrene block. Onto this small block of homopolybutadiene, the first block of polystyrene is formed and affixed and thereby made dispersible in hexane. This small block of polydiene is not large enough to alter the desired properties of the ultimate S-B-S block copolymer. This modification involves the same or similar techniques as previously used in the preparation of S-B-S polymers except that hexane is used as the solvent and a small amount of a conjugated diene is added prior to the addition of the amount of styrene used for the formation of the first polystyrene block.

As in previous practice, a hydrocarbyl lithium, preferably a secondary or tertiary alkyl lithium, is used as the initiator. To the polymerization system containing an appropriate amount of initiator is added the small amount of diene required to give the small soluble block of polydiene. This results in the formation of polyBd*-Li where the asterisk indicates the small block. When this small block formation is completed, the appropriate amount of styrene is added to give the desired molecular weight in the first polystyrene or S block. Polymerization is continued until conversion of the styrene monomer to polymer is substantially completed. Then butadiene is added to form the middle polybutadiene block. At the end of this block formation, the copolymer has the structure:

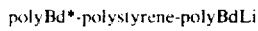
polyBd*-polystyrene-polyBdLi

At this point the polymer may be coupled with any one of well-known coupling agents such as an alkane dichloride of 1-10 carbon atoms, carbon monoxide, CCl₄, SiCl₄, PNCl₂, divinylbenzene, sec.-butyl chloride, CCl₃COOEt, to give the block copolymer having the structure:

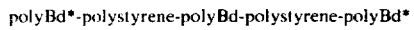
polyBd*-polystyrene-polyBd-polystyrene-polyBd*

In this product the residue of the coupling agent is in the middle of the polyBd block. Since it is so minute compared to the size of the total copolymer it has no noticeable effect on the characteristics of the block copolymer. The amount of butadiene used in preparing the polyBd block which is to be coupled is half the amount needed to give the desired molecular weight in the ultimate polyBd block in the final block copolymer. Moreover, because of the small size of the terminal polyBd* blocks these have very little effect on the characteristics or properties of the block copolymer so that it behaves essentially as an S-B-S type of block copolymer.

When the coupling agent is difunctional such as with the alkane dichlorides, carbon monoxide, PNCl₂, etc., the coupled product is of the true S-B-S type or more appropriately of the B*-S-B-S-B* type. However when the coupling agent is trifunctional, tetrafunctional or of higher functionality such as with CCl₄, SiCl₄, divinylbenzene, CCl₃COO Et, etc., the coupled product may be represented as B*-S-B(-S-B*)$_x$, where X may be an integer having a value of 2,3 or more. Where this formula is used to include the products obtained with difunctional coupling agents, X has a value of one. Therefore, the value of X is generally defined as having a value of 1 to 3.

The appropriate amount of coupling agent is calculated on the amount of needed to react with the number of lithium atoms present in the polymer. For example with a tetrafunctional coupling agent, such as CCl₄, one-fourth of the molecular weight of CCl₄ is calculated as required for each molecule of polymer or in other words, each atom of lithium present.

For simplicity and because the small size of the B* block has little effect on the ultimate properties of the block copolymer, the products are generally referred to as the S-B-S or S-B(-S)$_x$ type of block copolymer. However where the terminal B* blocks have more than the 12 parts of polybutadiene as defined herein, then various properties such as the green strength of the ultimate block copolymer may be adversely affected.

As previously mentioned, the residue of the coupling agent is buried in the middle of a B or polybutadiene block and is so minute in comparison with the bulk of the polybutadiene block that it has no noticeable effect on the properties of the block copolymer. Moreover, when a trifunctional or higher functional coupling agent is used, the resultant center polybutadiene block may be branched in accordance with the functionality of the coupling group. For example a trifunctional coupling agent may produce a triple branched polybutadiene whereas a tetrafunctional coupling agent, such as CCl₄ may produce a four-branched polybutadiene center block, depending on the proportions used. As a by-product, the Li is removed by reaction with chlorine and precipitated from the hexane solution as LiCl.

If desired the coupling step may be omitted and the ultimate block copolymer may be prepared by using sufficient butadiene to form the desired molecular weight in the ultimate middle polyBd block and when this formation is completed the appropriate amount of styrene is added to form the second polystyrene block. Then the Li is deactivated and removed by the addition of appropriate agents for this purpose, such as an alcohol, water, etc. The resultant block copolymer has the structure:

polyBd*-polystyrene-polyBd-polystyrene

The preparation of the block copolymer by the coupling technique has the advantage that during the formation of the ultimate middle polybutadiene block the copolymer has two terminal polybutadiene blocks which aid in the dispersibility during polymerization. However the product derived from the completely sequential block formation has the advantage of having in the ultimate product only one of the small terminal polyBd* blocks. Which advantage is of greater importance depends on the particular circumstances during preparation and the particular results desired in the product.

The dienes which may be used in preparing the initial small polydiene block are preferably conjugated dienes having 4-8 carbon atoms such as butadiene-1,3; isoprene; pentadiene-1,3; 2,3-dimethylbutadiene-1,3; etc. While butadiene-1,3, herein referred to as butadiene, is preferred for the middle polyBd block, the other conjugated dienes listed above may be used for this purpose. Moreover, although vinyl toluene may be used in place of some or all of the styrene in the S blocks, styrene is preferred.

In referring to "hexane" it is intended to include any of the various hexane isomers, such as n-hexane, isohexane and the various other isomers, either individually or as mixtures with each other.

Moreover, while normal alkyl, aryl and cycloakyl lithium may be used as initiators, those preferred are the secondary and tertiary alkyl lithium compounds having 4-8 carbon atoms per molecule. These include the secondary-butyl, tertiary-butyl, tertiary-amyl, tertiary-hexyl, etc. The lithium compounds suitable for this purpose are referred to as hydrocarbyl lithium compounds having up to 10 carbon atoms.

The amount of initiator to be used depends on the amount of monomer used and the molecular weights desired in the respective products. Under ideal conditions, where the polymerization system is free of impurities that will deactivate a portion of the initiator, the amount of initiator is determined by the amount of monomer being used for the initial block and the molecular weight desired in that block. Generally in such polymerizations, each initiator molecule (or lithium atom) is responsible for the initiation of one polymer chain. Then for subsequent blocks, and providing no deactivating impurities have entered the system, sufficient monomer is added in each case to form the desired molecular weight in the respective blocks in accordance with the number of atoms of lithium present in the polymer being formed.

The desirability for close control over the molecular weight of each of the individual blocks is emphasized by the several major utilities desired for these products. The block polymers per se are strikingly useful as "self-vulcanizing" elastomers when the correct relationship exists between the proportions of the elastomeric to non-elastomeric blocks and the individual molecular weights thereof. If the molecular weights of the plastic (non-elastomeric) blocks such as the polystyrene blocks are unduly high, or present in too high a proportion relative to the elastomeric blocks, the copolymer exhibits relatively poor elastomeric properties although it may be useful for other purposes such as adhesives or high impact resistant replacements for the usual thermoplastics such as polystyrene, polyethylene and the like.

Another reason for maintaining close control over the individual block lengths is that there is a relatively critical relationship between the block lengths and the effectiveness of the block copolymer in modifying other elastomers, such as polymers of conjugated dienes. In the latter instance, the principal object is to improve the green strength and processability characteristics of conjugated diene polymers. This objective is not realized to a maximum if the correct block lengths are not obtained. Furthermore, even if the average molecular weight of the individual block is within a target area, it has been found that this is not fully satisfactory if the average is merely that of a relatively wide spread in molecular weights. On the contrary, it is highly desirable to achieve polymer segments in which the molecular weights of the individual blocks are within a relatively narrow range. These objectives are better obtained by the use of secondary or tertiary alkyl lithium initiators.

The molecular weights of the individual blocks may be varied as stated hereinbefore, dependent upon the intended end use. For many purposes, such as use of the block copolymers as self-curing elastomers or for modification of conjugated diene elastomers, it is preferred to employ block polymers having the structure S-B-S wherein each S is an independently selected polymer block of styrene, the average molecular weight of each S being between about 10,000 and 100,000, B is a polymer block of a conjugated diene, the average molecular weight of the block being between about 30,000 and 150,000, the weight of the S blocks being less than about 50% by weight of the total copolymer.

The block copolymers may be modified with extending oils, particularly those which are compatible with the elastomeric segment, or with pigments or polystyrene, any of which may be present in amounts between about 0 to 100 parts by weight per 100 parts of the block copolymer.

Polymerization is advantageously conducted at temperatures in the range of $-20°$ to about $100°$ C., preferably at temperatures between about $20°$ and $65°$ C., the temperature being controlled to yield the polymer product within a reasonable length of time.

While conducting the polymerization it is generally satisfactory to use 200–900 parts by weight of hexane per 100 parts of monomer. This gives a fluid polymer solution or dispersion which can be easily handled.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

Polymerizations are generally performed in from 0.1 to 5 hours, preferably 0.5 to 5 hours, with the reaction proceeding essentially to completion.

Samples may be withdrawn from the reactor periodically during the polymerization to determine percent conversion (by measuring the total solids), color and character of the reaction mass, etc.

When the polymerization has progressed to the desired degree, the product is dropped or run into isopropanol or other medium which deactivates the initiator and precipitates the polymer product. Generally an amount of isopropanol equal in weight to the amount of hexane used is satisfactory for this purpose. It is advantageous also to have an antioxidant, such as approximately 1% of di-tertiarybutyl-para-cresol, in the isopropanol. The polymer precipitate is recovered and drum-dried to remove solvent.

The elastomers produced according to this invention may be mixed with the usual rubber compounding materials such as carbon blacks, fillers, processing oils and the like and still provide satisfactory physical properties. Preferably the elastomeric mid-sections of the block copolymer should have lengths corresponding approximately to the average molecular weight between crosslinks of normal vulcanized rubber. Since the subject block copolymers may be utilized without vulcanization, the molecular weights of the end groups should be high enough to prevent movement of the chain ends under the applied stress in the time intervals of its application.

The subject block copolymers are not only useful per se for the formation of injection moldings, compression molding, extrusions, film coatings, spray coatings or adhesives, but also for the formation of latices from which foam or dipped goods may be prepared as well as in compositions with other rubbers for the improvement in physical properties of the latter.

The block copolymers are especially useful for improving the processability of synthetic rubbers, especially elastomeric homopolymeric and random copolymeric olefinic (including mono-and diolefinic) particularly of conjugated dienes for the particular purpose of improving the green strength thereof. This is especially noticeable when the subject block copolymers are present in an amount of 5–50% by weight based on the total rubber content. Such blends have a bulk consistency 10–50 times greater than that of the unmodified rubber and greatly reduces bulk flow with no impairment of dynamic properties of carbon black vulcanizates made therefrom.

SPECIFIC EMBODIMENTS OF THE INVENTION

The invention is illustrated by the following examples which are intended merely for purpose of illustration and are not to be regarded as limiting the scope of the invention or the manner in which it may be practiced.

Unless specifically indicated otherwise, parts and percentages are given by weight.

EXAMPLE I

Into a freshly cleaned 2-gallon stainless steel reactor equipped with inlet and outlet means, an agitator and means for reading and controlling the temperature, there is added under a nitrogen atmosphere a solution containing 0.12 lb. of butadiene and 5 lbs. of hexane. Then 22 millimoles of sec.-butyl lithium is added. Polymerization is effected at 150° F. (65° C.) until conversion is substantially complete. Then 2.62 lbs. of a 45% solution of styrene in hexane is added (1.18 lbs. of styrene). At this time the color of the solution changes to yellow. Stirring is continued at 150° F. until the styrene has substantially completely polymerized at which time the product is a colloidal suspension. Then to this is added 3.40 lbs. of a 50% solution of butadiene in hexane (1.7 lbs. of butadiene). The yellow color disappears and solution viscosity increases as the butadiene is polymerized. Polymerization is continued at 150° F. to substantially complete conversion. The resultant B*SBLi product is coupled with 11 millimoles of CCl$_4$ to give B*-S-B(-S-B*)$_x$ product which is recovered by running the reaction solution into an equal volume of isopropanol containing 1% by weight of di-butyl-p-cresol. The precipitated product is drum-dried to give a 76% yield and has the properties reported below in Table I.

When the above procedure is repeated a number of times with the coupling effected with an equivalent amount of SiCl$_4$, similar block copolymer is obtained as with CCl$_4$.

EXAMPLE II

Into a freshly cleaned 2-gallon stainless steel reactor equipped with inlet and outlet means, an agitator and means for reading and controlling the temperature, there is added under a nitrogen atmosphere a solution containing 0.14 lbs. of butadiene and 3.5 lbs. of hexane. Then 22 millimoles of sec.-butyl lithium is added. Polymerization is effected at 150° F. (65° C.) until conversion is substantially complete. Then 3.25 lbs. of a 45% solution of styrene in hexane is added (1.46 lbs. of styrene). At this time the color of the solution changes to yellow. Stirring is continued at 150° F. until the styrene has substantially completely polymerized at which time the product is a colloidal suspension. Then to this is added 3.80 lbs. of a 50% solution of butadiene in hexane (1.9 lbs. of butadiene). The yellow color disappears and solution viscosity increases as the butadiene is polymerized. Polymerization is continued at 150° F. to substantially complete conversion. The resultant B*SBLi product is coupled with 11 millimoles of CCl$_4$ to give B*-S-B(-S-B*)$_x$ product which is recovered as in Example I and has properties similar to those reported in Example I.

EXAMPLE III

Into a freshly cleaned 2-gallon stainless steel reactor equipped with inlet and outlet means, an agitator and means for reading and controlling the temperature, there is added under a nitrogen atmosphere a solution containing 0.12 lbs. of butadiene and 3 lbs. of hexane. Then 22 millimoles of m-butyl lithium is added. Polymerization is effected at 150° F. (65° C.) until conversion is substantially complete. Then 3.2 lbs. of a 45% solution of styrene in hexane is added (1.44 lbs. of styrene). At this time the color of the solution changes to yellow. Stirring is continued at 150° F. until the styrene has substantially completely polymerized at which time the product is a colloidal suspension. Then to this is added 3.60 lbs. of a 50% solution of butadiene in hexane (1.8 lbs. of butadiene). The yellow color disappears and solution viscosity increases as the butadiene is polymerized. Polymerization is continued at 150° F. to substantially complete conversion. The resultant B*SBLi product is coupled with 11 millimoles of secondary-butyl Cl to give a B*-S-B-S-B* product recovered as in Example I and with properties similar to those of the product of Example I.

EXAMPLE IV

The procedure of Example II is repeated a number of times using equivalent amounts respectively of 2,4-dichlorohexane, PNCl$_2$, CCl$_3$COOEt and divinylbenzene as the coupling agent. In each case a B*-S-B(-S-B*)$_x$ product is obtained which is recovered as in Example I and has properties similar to those of the product of Example I.

EXAMPLE V

Into a freshly cleaned 2-gallon stainless steel reactor equipped with inlet and outlet means, an agitator and means for reading and controlling the temperature, there is added under a nitrogen atmosphere a solution containing 0.14 lbs. of butadiene and 5 lbs. of hexane. Then 22 millimoles of n-butyl lithium is added. Polymerization is effected at 150° F. (65° C.) until conversion is substantially complete. Then 3.25 lbs. of a 45% solution of styrene in hexane is added (1.46 lbs. of styrene). At this time the color of the solution changes to yellow. Stirring is continued at 150° F. until the styrene has substantially completely polymerized at which time the product is a colloidal suspension. Then to this is added 3.80 lbs. of a 50% solution of butadiene in hexane (1.9 lbs. of butadiene). The yellow color disappears and solution viscosity increases as the butadiene is polymerized. Polymerization is continued at 150° F. to substantially complete conversion. Then 3.25 lbs. of a 45% solution of styrene in hexane is added (1.46 lbs. of styrene) and stirring continued at 150° F. until the styrene has substantially completely polymerized. The product is recovered as in Example I and has properties similar to the product of Example I.

The polymers produced according to this invention as illustrated in the preceding working examples may be used in various formulations for tire compositions in which the elastomer is extended with mineral oil. In such formulations it has been found that the addition of 5–25 parts by weight of poly(alphamethyl-styrene) of a molecular weight range of 25,000–75,000 per 100 parts of block copolymer, has a beneficial effect. This is shown in the following table which reports the effect of varying amounts of the poly(alpha-methyl-styrene). For these tests, the block polymer of Example I is used and the polymer mixtures are worked on a hot mill at 230° F. before molding test sheets. Instron tests are performed on 0.05 inch rings instead of the dumbbell samples generally used. The oil used is a commercially available grade sold under the trademark "Shell 871" and the poly(alpha-methyl-styrene) is of about 50,000 molecular weight.

TABLE

| Sample No. | I | II | III | IV | V | VI | VII |
|---|---|---|---|---|---|---|---|
| RRR-727 | 100 | 100 | 100 | 100 | 100 | 100 | 100 |
| Oil | 0 | 39 | 30 | 30 | 30 | 30 | 30 |
| Poly(alpha-methyl-styrene) | — | — | 5 | 10 | 15 | 20 | 25 |
| Test on 0.5" rings | | | | | | | |
| 300% modulus | 3.26 | 1.82 | 1.82 | 2.02 | 2.01 | 1.90 | 2.05 |
| (psi) | (474) | (264) | (265) | (294) | (292) | (276) | (298) |
| Tensile Strength | 9.2 | 11.2 | 15.4 | 15.5 | 16.1 | 16.9 | 16.3 |
| (psi) | (1339) | (1629) | (2238) | (2259) | (2335) | (2449) | (2360) |
| Elongation | 645% | 945% | 973% | 980% | 965% | 1010% | 1003% |

In some cases it may be desirable to have the center or polybutadiene block one of mixed butadiene and styrene or made by random copolymerization. In such cases, a mixture of butadiene and styrene may be added gradually during the formation of this block, or the styrene may be added first and butadiene added gradually. In this way the copolymerization of styrene during the formation of the central block is insured.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. In the process of preparing block copolymers predominantly of the structure S-B-S with one or two small polybutadiene terminal blocks, wherein S represents a block of polystyrene and B represents a block of polybutadiene, by the steps of polymerizing the individual monomers to form the respective blocks, such polymerizations being initiatated by a lithium compound, the improvement whereby:

(a) said polymerization is effected in a solvent consisting essentially of hexane;

(b) said polymerization is initiated by a hydrocarbyl lithium compound having up to 10 carbon atoms;

(c) as a precursor to the preparation of a first block of polystyrene, there is prepared initially a block of homo-polybutadiene representing 2-12 parts by weight per 100 parts by weight of the block of polystyrene to which this initial block of polybutadiene will be attached, by reacting said hydrocarbyl lithium with an appropriate amount of butadiene to give said size block and thereby produce a polybutadiene*-Li product, wherein * indicates said small size block;

(d) sufficient styrene is added to the product of step (c) to give the desired molecular weight of the desired first S block and effecting polymerization of said styrene with said polybutadiene*-Li to give the product polybutadiene*-polystyrene-Li while still dispersed in said hexane;

(e) thereafter adding an appropriate amount of butadiene to the dispersed product of step (d) to form a desired size block of polybutadiene and effecting polymerization of said butadiene with said polybutadiene*-polystyrene-Li to give the product polybutadiene*-polystyrene-polybutadiene-Li while still dispersed in said hexane, and (f) thereafter effecting the addition of a second block of polystyrene onto said polybutadiene*-polystyrene-polybutadiene-Li.

2. The process of claim 1 in which the addition of said second block of polystyrene is effected by the reaction of a coupling agent with said polybutadiene*-polystyrene-polybutadiene-Li.

3. The process of claim 1 in which said second block of polystyrene is added by effecting polymerization of an additional amount of styrene with said polybutadiene*-polystyrene-polybutadiene-Li.

4. The process of claim 2 in which said coupling agent is selected from the class consisting of $CCl_4$, secondary-butyl chloride, carbon monoxide, an alkyl dichloride of 1-10 carbon atoms, $SiCl_4$, $PNCl_2$, divinylbenzene and $CCl_3COOR$ where R is an alkyl group of 1-10 carbon atoms.

5. The process of claim 4 in which said coupling agent is $CCl_4$.

6. The process of claim 4 in which said coupling agent is divinylbenzene.

7. The process of claim 4 in which said coupling agent is secondary-butyl chloride.

8. The process of claim 1 in which said hydrocarbyl lithium compound is selected from the class consisting of secondary and tertiary alkyl lithium compounds of 4-8 carbon atoms.

9. The process of claim 1 in which said hydrocarbyl lithium compound is a secondary alkyl lithium compound of 4-8 carbon atoms.

10. The process of claim 1 in which said hydrocarbyl lithium compound is secondary-butyl lithium.

11. The process of claim 1 in which said initial block of homo-polybutadiene represents 5-10 parts by weight per 100 parts by weight of the block of polystyrene to which this initial block of homopolybutadiene is attached.

* * * * *